Figure 1:
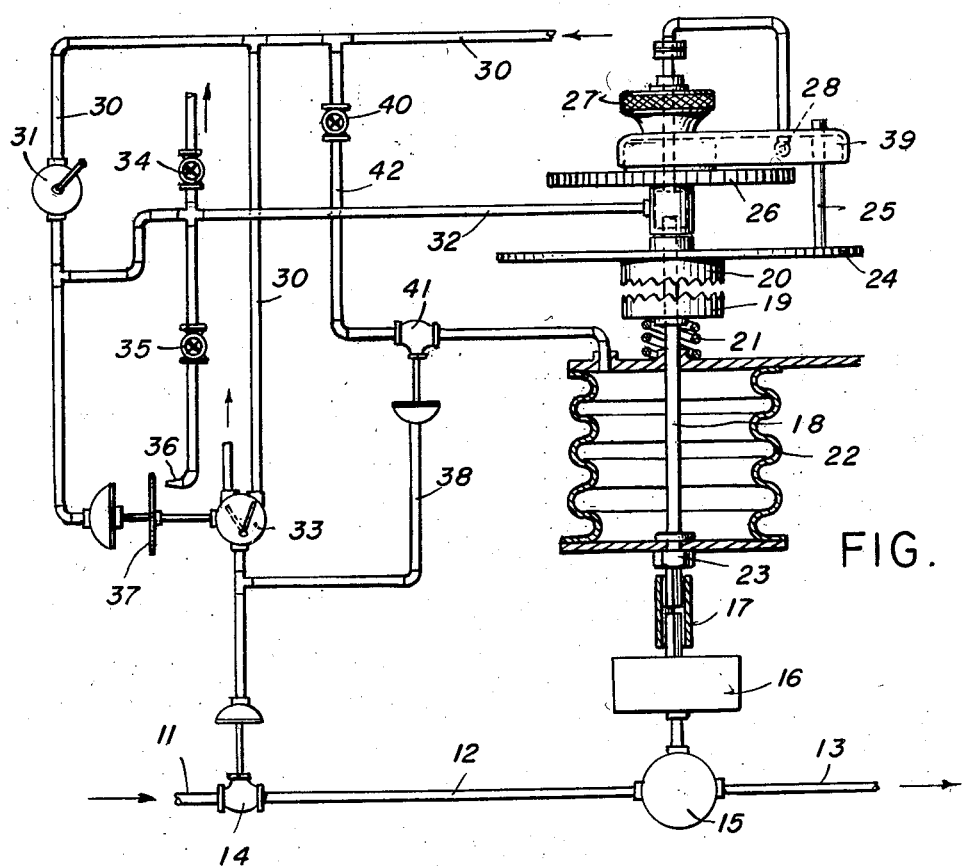

Feb. 11, 1958  V. WOHLER  2,822,955
APPARATUS FOR DELIVERING A PREDETERMINED
QUANTITY OF A FLOWING LIQUID
Filed Sept. 6, 1955

INVENTOR
VIKTOR WOHLER

BY *Wenderoth, Lind & Ponack*

ATTORNEYS

United States Patent Office 2,822,955
Patented Feb. 11, 1958

2,822,955

APPARATUS FOR DELIVERING A PREDETERMINED QUANTITY OF A FLOWING LIQUID

Viktor Wohler, Therwil, Switzerland, assignor to Ciba Limited, Basel, Switzerland, a Swiss firm Application September 6, 1955, Serial No. 532,554

Claims priority, application Switzerland September 3, 1954

5 Claims. (Cl. 222—20)

In heavy industry, especially in the chemical industry, the problem exists of delivering a predetermined quantity of a liquid flowing, for example, into a reaction vessel in such manner that the flow of liquid is cut off when the predetermined quantity has been reached. For this purpose there may be used a rotary liquid-volume meter, for example, of the cycloidal counter type. Such a meter generally gives a sufficiently accurate reading, and can be constructed of materials which are resistant to many corrosive liquids, for example, acids. However, these liquid-volume meters often yield relatively little mechanical power, so that in many cases they cannot be coupled mechanically to a valve for cutting off the flow of liquid at the proper moment, for example, by means of a cam shaft. In chemical factories electrical operation of the valve is frequently undesirable, because electric contacts are easily fouled or work unreliably due to the presence in the atmosphere of corrosive gases and vapours, and also because it is difficult with electrically operated valves to secure a reliable and tight closure of conduits through which corrosive liquids are flowing.

The present invention provides an apparatus for automatically delivering a predetermined quantity of a flowing liquid, in which the liquid-supply valve is operated by a fluid under pressure, especially air, and in which a rotary liquid-volume meter is mechanically coupled to a cut-off mechanism which is adapted, when the predetermined quantity of liquid has been delivered, to cause a change in the fluid pressure acting on the pressure responsive valve which controls the fluid pressure that operates the liquid-supply valve.

It is of advantage to use a liquid-supply valve which closes when the pressure fails, so that in the event of a disturbance in the pressure line, for example, compressed air line, an accidental flow of liquid is prevented. It is also of advantage to connect the cut-off mechanism to the liquid-volume meter through a disengageable coupling, so that after or, if desired, during the flow of liquid the cut-off mechanism can be returned to the zero position, for example, in order to rectify a fault. In a preferred form of the apparatus disengagement of the coupling between the rotary liquid-flow meter and the cut-off mechanism is brought about pneumatically, for example, by means of a bellows, which disengages a toothed-wheel clutch of friction clutch.

It is also of advantage in the apparatus of the invention to provide, in addition to the automatically operated cut-off mechanism, means which can be operated manually at will to commence the flow and also to terminate the flow.

As the fluid under pressure for operating the liquid-supply valve it is preferable to use compressed air. As a supply of compressed air is usually available in chemical factories for a very wide variety of purposes, especially for discharging reaction vessels, the apparatus of this invention will generally not entail special complications. There is little tendency for apparatus operated by compressed air, in particular the cut-off mechanism of this invention, to suffer corrosion by the surrounding atmosphere, because the atmosphere in the interior of the apparatus is being continually cleaned due to the escape of compressed air from nozzles or valves. The compressed air to be used for controlling the valves may be cleaned in known manner by first passing it through a filter, and then it will not normally cause trouble.

If desired, in special cases a different pressure fluid, such as water or oil, may be used.

The pneumatically controlled cut-off mechanism of the invention is advantageously so constructed that, when a predetermined quantity of liquid has been delivered, the movement of a metering disc, which gives a reading of the quantity of liquid delivered, closes or preferably opens a small bleed nozzle, whereby the pressure in the nozzle conduit is changed and the control operations described above are performed. The closing and opening of the nozzle is advantageously effected by a resilient flap.

Figure 2:
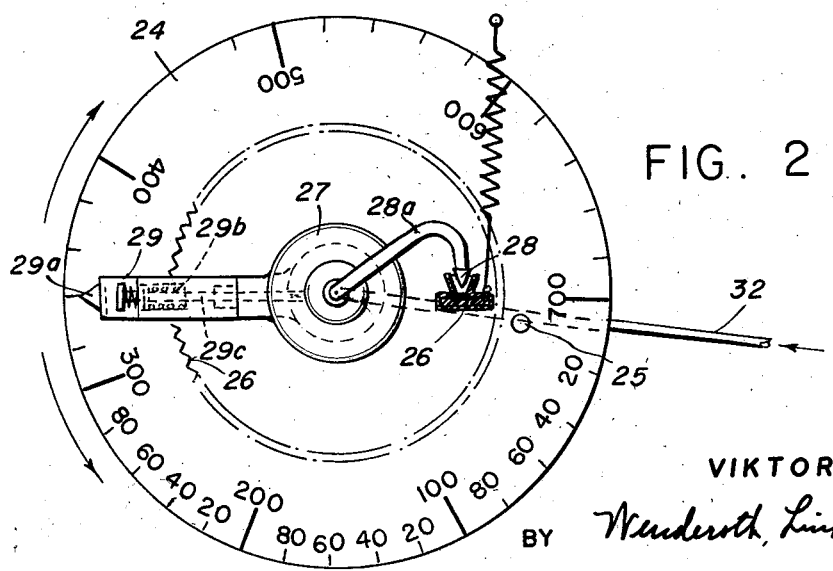

An example of apparatus in accordance with the invention is shown in the accompanying drawings, in which Fig. 1 shows the general arrangement of the apparatus, and Fig. 2 is a plan view of another form of cut-off mechanism.

The liquid to be measured flows through the conduits 11, 12 and 13, and passes through a pneumatically controlled supply valve 14, which opens under the pressure of the air used to control the apparatus, and through a liquid-volume meter 15, for example, of the cycloidal counter type, made of acid-resistant material. A reduction gear 16 is coupled to the liquid-volume meter. On its output side the reduction gear is connected through a slidable coupling 17 on slidable spindle 18 to a crown wheel 19. The latter is urged by a spring 21 into engagement with a crown wheel 20, when no control pressure is acting on a fixedly mounted bellows 22. Otherwise the bellows, due to the pressure therein, overcomes the action of the spring 21 and depresses a nut 23 on the shaft 18 and so disengages the coupling between the crown wheels 19 and 20. When this occurs a counter wheel 24, which is fixed to the crown wheel 20, flies back into its zero position under the action of a spring (not shown), a pin 25 mounted on the counter wheel 24 herving as a stop. The counter wheel 24 also enables the quantity of liquid, which has already been delivered, to be read on a scale (not shown).

Above the counter wheel 24 is a setting wheel 26 with a hand grip 27, a nozzle 28, and a flapper 39. 30 denotes the supply conduit for air under pressure. The conduit supplies air under pressure through a throttle valve 31 and conduit 32 to the nozzle 28, and also to a control diaphragm of a valve 33 and to two push button valves 34 and 35, of which the valve 34 opens when operated, but is otherwise closed, and of which the valve 35 closes when operated, but is otherwise open. The conduit 32 also supplies air under pressure through the valve 35 to a nozzle 36. Valve 33 opens when there is sufficient pressure in the conduit 32. A disc 37 closes the nozzle 36 when the valve 33 is opened.

The valve 14 is controlled by pressure from the supply conduit 30 through the valve 33 and conduit 38, and pressure is cut off from the valve 14 when the valve 33 is reversed.

A conduit 42 supplies air to the bellows 22 from a push button restoring valve 40, which opens when operated but is otherwise closed, through a stop valve 41 which is closed when subjected to the control pressure in the conduit 38 but is otherwise open.

The operation of the apparatus is as follows: The hand grip 27 is rotated to the setting necessary for delivery of the quantity of liquid desired. At the same time, in addition to an indicator (not shown) being moved along the scale, the setting wheel 26, on which the nozzle- and -flapper arrangement 28, 39 is mounted, is adjusted. The latter arrangement is such that when air is supplied through the throttle valve 31 to the nozzle 28 the dynamic pressure behind it is considerably lowered when the flapper 39 is lifted off the nozzle. The counter wheel 24, which is driven by the cycloidal counter meter and therefore continuously registers the amount of liquid which has flowed since the beginning of a charge, carries the pin 25 which lifts the flapper 39 off the nozzle 28 when the predetermined quantity of liquid has been delivered. However, the dynamic pressure behind the nozzle does not act directly on the valve 14, because, with the throttling required, it would take too long for the device actuating the valve to reach the pressure necessary to open it, but acts on a power intensifying device consisting of the small diaphragm valve 33, which requires a very small volume of air to operate it and, when operated, releases a large amount of air to operate the supply valve 14 and, conversely, discharges a large amount of air for closing the valve 14. Assuming that the counter wheel 24 and setting wheel 26 are at zero at the beginning of an operation, then the pin 25 holds the flapper 39 away from the nozzle 28 and the diaphragm valve 33 is closed. The apparatus is then set to deliver a predetermined quantiy of liquid, and this causes closure of the nozzle 28 and would cause opening of the valve 33 due to the rise in pressure. However it is desired that flow of the liquid should not begin until a push button is operated. To this end the conduit 32 is connected to a second nozzle 36 through which as much air can escape as through the main nozzle 28. Only when both nozzles are closed does the pressure in the conduit 32 rise. When the button of the valve 35 is depressed, the conduit leading to the second nozzle is closed for a short time. If at this moment the first nozzle 28 is also closed (which is the case only when the apparatus has been set for delivering a predetermined quantity of liquid), the diaphragm valve 33 opens and simultaneously the second nozzle 36 is closed by the movement of the disc 37. If it is desired to interrupt the charge during the delivery of the liquid, the nozzle conduit 32 is opened by operating the press button of the valve 34 and on releasing the button the conduit remains open, because the nozzle 36 has been opened due to the fall in pressure closing the valve 33.

When the predetermined quantity of liquid has been delivered, the pin 25 lifts the flapper 39 off the nozzle 28, the pressure in the conduit 32 falls, the valve 33 releases the valve 14 from the control pressure and the latter valve closes. When the charging operation is complete, the counter wheel is reset to zero by pressing the button of valve 40. This causes compressed air to enter the bellows 22 and the latter disengages the crown wheels 19 and 20. Under the action of a tensioned spring the counter wheel flies back to zero.

In order to prevent the measuring indicator, during a charging operation, moving back to zero and causing a false reading, due to accidental operation of the button of the valve 40, a further small diaphragm valve 41, which is kept closed by the control pressure acting on the supply valve 14, blocks the air conduit leading to the zero-adjusting bellows 22 so long as the control pressure is acting on the valve 14, that is to say, so long as liquid is still flowing.

In the cut-off mechanism shown in Fig. 2 the conduit 28a having the nozzle 28 is fixed to the base, that is to say, it is not capable of turning with a setting wheel 26 and hand grip 27 as described with reference to Fig. 1. The conduit 28a may alternatively be connected to the conduit 32 at a position externally of the counter wheel 24 and lead from that position on to the wheel 24. The flapper 26a is fixed to a rotatable disc 26 and is pressed against the nozzle 28 by spring pressure. Presetting is effected by means of an indicator 29 which is rotatable about the disc 26, and has a pointer 29a. The indicator 29 is held in the desired position on the disc 26 by means of the teeth on the outer edge of the disc and the mechanism 29b and 29c.

When the pin 25 on the counter wheel 24 encounters the indicator 29 the pin rotates the disc 26 with it slightly so that the flap 26a is lifted off the nozzle 28 and the cutting-off operation is initiated. The quantity of the liquid remaining to be delivered at any given time in order to complete the charge can be read by observing the position of the pointer 29a.

What is claimed is:

1. Apparatus for automatically delivering a predetermined quantity of a flowing liquid through a liquid supply circuit, comprising, a liquid supply valve in the supply circuit operable by fluid pressure from outside the supply circuit, a rotary liquid volume meter in the liquid supply circuit, a nozzle-valve mechanically coupled to said meter and operated thereby when a predetermined quantity has been delivered, a fluid operated relay valve connected to and operated by said nozzle valve, said fluid relay valve controlling the fluid pressure for operating said liquid supply valve, whereby after delivery of a predetermined quantity of liquid the meter operates the nozzle-valve, which in turn operates the fluid relay valve, which in its turn actuates the supply valve and stops the supply of liquid.

2. Apparatus for automatically delivering a predetermined quantity of a flowing liquid through a liquid supply circuit, comprising, a liquid supply valve in the supply circuit operable by fluid pressure from outside the supply circuit and closed when no fluid pressure is applied to said valve, a rotary liquid volume meter in the liquid supply circuit, a nozzle-valve mechanically coupled to said meter and operated thereby when a predetermined quantity has been delivered, a fluid operated relay valve connected to and operated by said nozzle valve, said fluid relay valve controlling the fluid pressure for operating said liquid supply valve, whereby after delivery of a predetermined quantity of liquid the meter operates the nozzle-valve, which in turn operates the fluid relay valve, which in its turn actuates the supply valve and stops the supply of liquid.

3. Apparatus for automatically delivering a predetermined quantity of a flowing liquid, which comprises a liquid-supply valve operated by a fluid under pressure, a rotary liquid-volume meter, a movable member mechanically coupled with the said rotary liquid-volume meter which indicates the quantity of liquid measured by the said volume meter, and a protruding part of the said movable member which is positioned so as to engage at a predetermined point corresponding to the predetermined quantity of liquid a flapper in close proximity to a nozzle to which fluid pressure is applied whereby a change in the fluid pressure is produced in the conduit leading to the said nozzle, a pressure-responsive valve connected to the said conduit, the fluid pressure delivered by the said valve being led to the control inlet of the first mentioned liquid supply valve.

4. Apparatus as claimed in claim 3, further comprising a coupling between the liquid-volume meter and the movable member, a spring connected to said movable member for resetting it to its starting position, means operated by fluid pressure for disengaging said coupling and thus permit the movable member to return to starting position under the action of said spring, and means operated by the fluid pressure operating the liquid supply valve for preventing the return of the cut-off mechanism to its starting position as long as the liquid-supply valve is open.

5. In an apparatus for automatically delivering a predetermined quantity of a flowing liquid through a supply circuit having a rotary liquid volume meter therein, a mechanism mechanically coupled with the rotary liquid volume meter and comprising a rotatable member having a protruding part thereon, a flapper, a nozzle resiliently closed by said flapper, said protruding part engaging said flapper at a predetermined position of said rotatable member to open said nozzle.

References Cited in the file of this patent
UNITED STATES PATENTS

| | | |
|---|---|---|
| 1,919,828 | Crosby | July 25, 1933 |
| 1,938,621 | Cornell | Dec. 13, 1933 |
| 2,040,815 | Brouse | May 12, 1936 |